Patented Feb. 10, 1942

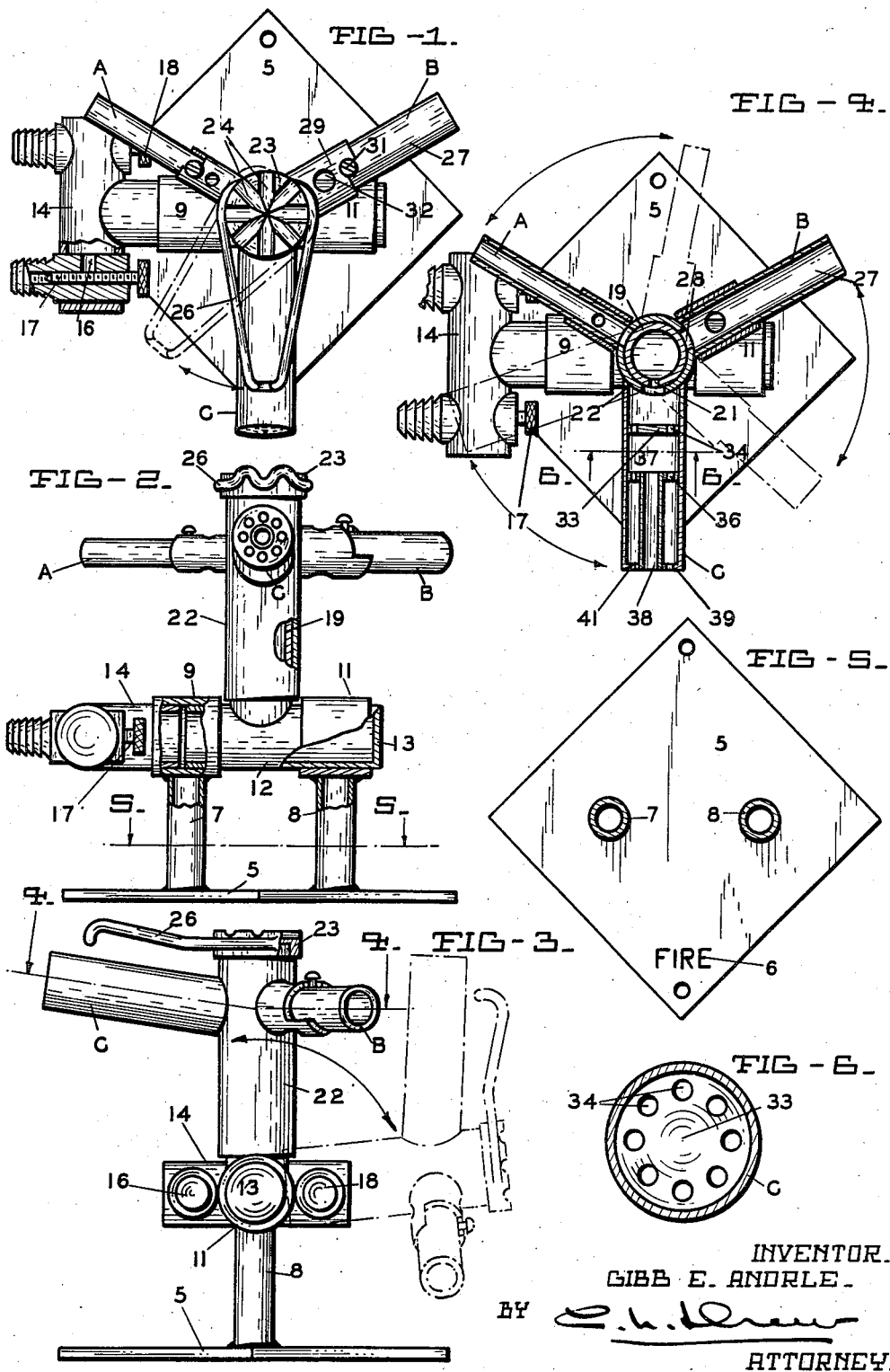

2,272,593

UNITED STATES PATENT OFFICE 2,272,593

ROTARY BURNER

Gibb E. Andrle, Oakland, Calif.

Application October 19, 1940, Serial No. 361,907

1 Claim. (Cl. 158—111)

This invention relates to improvements in burners and has particular reference to a rotary burner for use in heating parts for soldering, brazing, etc.

The principal object of this invention is to produce a burner which may be used as a Bunsen burner, a blow torch, or a tool heating heater, as the necessity demands.

A further object of the invention is to produce a device of this character which may be so manipulated that the flame may be directed to any desired spot so that the heating of the material or the soldering part may be easily accomplished.

A further object of the invention is to produce a device of this character which is economical to manufacture, simple to manipulate, and one which is readily transportable whereby several operators may use the same torch along a work bench.

Other objects and advantages will be apparent during the course of the following description.

In the accompanying drawing forming a part of this specification and in which like numerals are employed to designate like parts throughout the same, Fig. 1 is a top plan view of my device;

Fig. 2 is a side elevation of Fig. 1;

Fig. 3 is a front elevation of Fig. 1, looking from the right of the drawing;

Fig. 4 is a cross sectional view taken on the line 4—4 of Fig. 3;

Fig. 5 is a cross sectional view taken on the line 5—5 of Fig. 2; and

Fig. 6 is an enlarged cross sectional view taken on the line 6—6 of Fig. 4.

In many manufacturing processes, it is necessary to heat material for soldering or brazing and to also heat soldering irons. In some instances, it is necessary to employ a blow torch arrangement in order to accomplish the correct heating of the material, and at other times it is merely necessary to employ a Bunsen type burner.

It has been customary to use several independent burners which are rigid in construction and, therefore, will not reach out of the way places. Therefore, applicant has devised a burner wherein a rotatable head carries a series of burner tips, each having its individual characteristics so that any one may be employed, depending upon the type of flame needed. Applicant has further provided means for directing the direction of the flame against the work, as will be later seen.

In the accompanying drawing wherein for the purpose of illustration is shown a preferred embodiment of my invention, the numeral 5 designates a base, preferably rectangular in shape, having indicia 6 formed thereon, the purpose of which will be later seen.

The numerals 7 and 8 designate supports, each supporting a bearing, as shown at 9 and 11 respectively. Rotatably mounted in the bearings 9 and 11 is a horizontally disposed member 12 closed at one end, as shown at 13, and open at its opposite end so as to communicate with a T-fitting 14, which T-fitting in turn communicates through ports 16 with a gas valve 17 and an air valve 18. It is, of course, understood that gas and air are conducted to these valves in any approved manner. The horizontal member 12 has secured thereto and communicating with the interior thereof an upstanding hollow member 19, which is provided with a port 21, the purpose of which will be later seen. Slidably and rotatably positioned on the upstanding member 19 is a rotatable member 22 which has its upper end closed and supports a cap 23 in which grooves 24 are formed. A wire support 26 is secured to the cap 23 and serves as a tool holder, as will be later explained.

Projecting from the rotatable member 22 is a plurality of burners A, B, and C. The burners A and B are both Bunsen type burners, the burner A being of smaller size than the burner B. As the construction is identical, but one will be described. Each of these burners consists of a tube 27 communicating with an orifice 28 formed in the rotatable member 22 and having a sleeve valve 29 adjustably held by a screw 31. This sleeve valve has a port 32 which registers with a similar port in the tube 27, whereby the secondary air to the burner may be adjusted and then secured by the screw 31. When the rotatable member 22 is moved so as to bring one of the orifices 28 into registry with the port 21, air and gas from the supply will issue through the tube of the burner A or B, as the case may be, and a Bunsen flame will issue therefrom when ignited. The burner C is different in construction in that a baffle 33 is placed within the burner tube, which is of considerably larger diameter, and this baffle has a plurality of openings 34 therethrough which are in alignment with ports 36 of a secondary baffle 37. A pipe 38 communicates with the secondary baffle and an outlet plate 39, which also has ports 41. Consequently, when the burner C is in alignment with the port 21, gas issuing therefrom will first strike the baffle 33, will be diverted through the ports 34, through the ports 36 and through the ports 41 where this gas will be ignited. Gas will also issue through the pipe 38 and likewise be ignited.

The result is that I have strong flame in the center surrounded by an outer flame, which outer flame maintains combustion when an extra amount of air is admitted to the burner so as to produce a blow torch effect, not possible with a Bunsen type burner. This additional amount of air with a Bunsen type burner would blow the fire out, and the Bunsen burner could not be ignited.

When desired, the upstanding member 19 and the burners rotatably supported thereon may be swung in the bearings 9 and 11, as shown in dotted lines in Fig. 3, so that the ignited burner may be placed in a vertical position or in any other desired angular position, as the work may call for.

The wire support 26 may be moved so that a soldering iron or other heating tool may be held in the flame, or the same may be moved, as shown in dotted lines in Fig. 1, so that the tool will be out of the path of the flame.

The indicia on the base 5 indicates the burner which may be used, the port 21 being on the side toward this indicia. Therefore, only the burner which is positioned above the indicia will communicate with the port and the gas supply issuing therefrom.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a base, a pair of supports mounted on said base, each of said supports having a bearing in axial alignment one with the other, a horizontally positioned member rotatably supported in said bearings, a vertical member secured to said horizontal member and communicating with the interior thereof, a rotatable member mounted on said vertical member, a plurality of burners radially arranged on said rotatable member, a port formed in said vertical member and communicating with but one of said burners when said burners are rotated successively into alignment therewith, means for delivering a combustible mixture to said rotatably supported horizontal member, said means including a T-shaped member secured to one of said bearings, and valves mounted in said T-shaped member and communicating with the interior thereof.

GIBB E. ANDRLE.